Dec. 31, 1940. W. HARTMANN 2,227,344
LIQUID FILTER
Filed Sept. 28, 1939
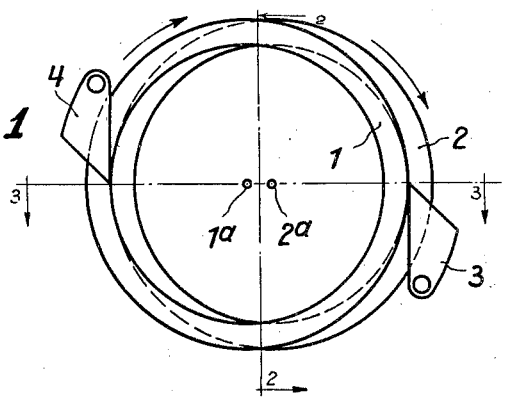
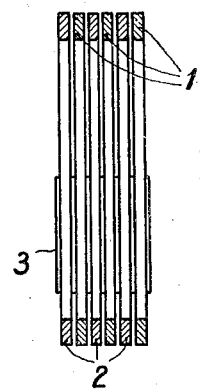
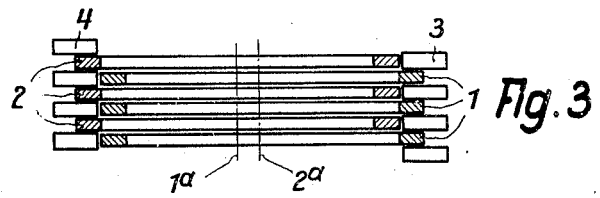
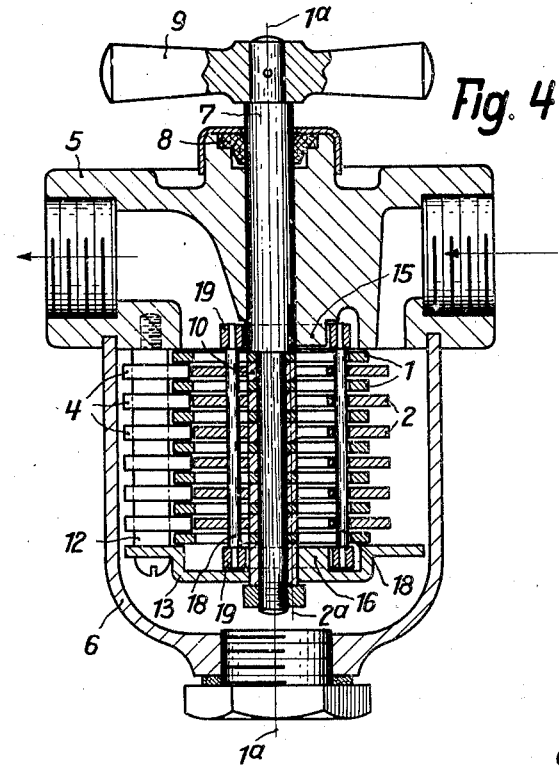
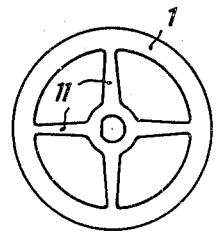
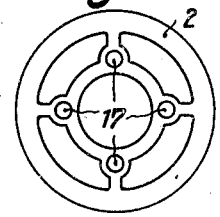
Inventor:
Willy Hartmann,
By Potter, Pierce & Scheffler,
Attorneys.

Patented Dec. 31, 1940

2,227,344

UNITED STATES PATENT OFFICE 2,227,344

LIQUID FILTER

Willy Hartmann, Stuttgart, Germany pplication September 28, 1939, Serial No. 296,989
In Germany September 23, 1938

7 Claims. (Cl. 210—167)

This invention relates to liquid filters and particularly to multiple slit filters composed of a plurality of superposed filter plates.

It has been proposed to clean such filters either mechanically by scrapers or by reversing the direction of liquid flow. The objections to reverse flushing are that the filter is out of service during the cleaning operation or, if kept in service, the dirt loosened from the filter plates can pass off with the filtered liquid. The prior scraper constructions have been mechanically weak as the scrapers were designed as thin blades for entering the slits between adjacent filter plates that are usually spaced apart by less than a tenth of a millimeter. The scraper blades were only a few hundredths of a millimeter in thickness and, even when made of the best materials, these scraper blades would break after some time because of fatigue or overstrain. The damage from the entrainment of broken-off particles of scraper blades in the liquid stream was especially serious in the case of filters for the lubricating oil of machinery, and the engines of motor vehicles and aircraft. It has been the general practice to operate the scrapers manually from time to time, or, in some instances, mechanically by a member that comes into action only intermittently, and it has not been proposed to clean the filters automatically and continuously.

An object of the present invention is to provide a filter of the multiple slit, multiple plate type that may be cleaned continuously by mechanical scrapers of rugged design that are substantially free from breakage. An object is to provide a multiple slit filter including two sets of filter plates that are alternately arranged, the sets of plates being mounted for rotation about spaced axes, and sets of scrapers in fixed positions for cleaning the opposite faces and the edges of the filter plates as they rotate past the scrapers. More specifically, an object is to provide a multiple slit filter in which alternate plates are supported for rotation about spaced axes, and fixed scrapers of a thickness greater than the blades are so mounted that each scraper cleans the edge of one filter plate and the opposed faces of the two adjacent filter plates. An object is to provide a filter in which alternate plates are fixed respectively to a central stem or shaft and to hubs eccentric to the stem or shaft, and two sets of scrapers are mounted with their cleaning edges in the plane through the axes of the stem and hubs, the scrapers of each set extending between two filter plates to engage the edge of a third plate intermediate the first two plates.

These and other objects and advantages of the invention will be apparent from the following specification when taken with the accompanying drawing in which:

Figs. 1, 2 and 3 are diagrammatic views illustrative of the invention, Fig. 1 being a plan view of a plurality of filter plates and their associated scrapers, and Figs. 2 and 3 being sectional views on lines 2—2 and 3—3, respectively, of Fig. 1.

Fig. 4 is a central vertical section through an embodiment of the invention; and Figs. 5 and 6 are plan views of the two types of filter plates that are alternately arranged in the Fig. 4 filter.

As shown diagrammatically in Figs. 1 to 3, the filter plates are of the usually annular form and all of the same size but arranged in sets of plates 1 and 2 in alternation, the plates 1 being rotatable about the axis $1^a$ and the plates 2 being rotatable about the axis $2^a$ in the direction indicated by the arrows. The axis of each plate coincides with its axis of rotation and the sets of plates are therefore laterally displaced or eccentric to each other. Scrapers 3 are arranged between each pair of plates 2 with their inner edges bearing on the intermediate plates 1, and a second set of scrapers 4 is similarly arranged to extend between the plates 1 to engage the edges of the plates 2. The scrapers 3, 4 are each of approximately triangular shape in plan with a cutting edge parallel to the axes of the sets of filter plates, and the two sets are located at opposite sides of the assembly of filter plates with the cutting edges of the scrapers preferably in the plane extending through the axes $1^a$ and $2^a$. The thickness of each scraper is theoretically equal to the thickness of a filter plate plus twice the height of a slit but, to avoid undue friction, the scrapers are made slightly thinner than the theoretical value. The scrapers may be made of any desired thickness by increasing the thickness of the plates, and the possibility of damage to the scrapers may thus be eliminated without increasing the height of the filter slits.

The axes $1^a$ and $2^a$ are spaced apart by a distance not greater than the radial length of the filter surfaces and may have a substantially less spacing as satisfactory results are obtained when the cleaning action is restricted to about one-half the width of the filter surfaces of the plates. At each complete rotation of the filter plates, both sides and the edges of the plates are cleaned by the scrapers, each set of scrapers cleaning the sides or faces of one set of plates and the edges of the other set of plates.

A practical embodiment of the invention as shown in Figs. 4 to 6 comprises a cover member in the form of a casting or molded body 5 having oppositely arranged inlet and outlet openings that extend to the lower surface of the cover at different distances from its vertical center, and a cup or filter receptacle 6 that is secured to the cover in any desired or appropriate manner. A rotatable stem or shaft 7 extends through the cover 5 and is sealed from the outside by a packing sleeve 8. The shaft 7 may be rotated continuously at slow speed by appropriate connection to the machine with which the filter is associated but, for simplicity of illustration, the shaft is shown as carrying a manually operable handle 9.

The set of annular filter plates 1 is mounted on the non-circular lower end of shaft 7 and the customary spacer washers 10 are arranged between adjacent plates. The thickness of the plates and their spacing is greatly exaggerated for clearness of illustration, and the number of plates and filter slits, in the receptacle, will therefore be considerably greater than the number shown in Fig. 4. As shown in Fig. 5, the plates 1 are of skeleton form and have spaced arms 11 connecting the annular filter sections of the plates to their mounting hubs. The scrapers 3, 4 are mounted on rods or bolts 12 that are threaded into the cover 5 and carry an end plate 13 in which the lower end of the shaft 7 is journalled. The cover 5 and end plate 13 have circular hubs 15, 16, respectively, that are eccentric to the shaft 7, the axes 1ª and 2ª of the shaft and hubs, respectively, being indicated by broken lines in Fig. 4.

The filter plates 2 may be of the form, as shown in Fig. 6, of concentric annular portions joined by radial arms having openings 17 for receiving the rods 18 that are mounted in collars 19 rotatably mounted on the hubs 15, 16, respectively. Spacers may be used between the plates 2 or, as illustrated, the spacers may be omitted and the plates left freely movable to adjust their positions automatically by the liquid pressure.

The operation of the filter is as follows. Rotation of shaft 7 manually or automatically carries the set of plates 1 with it, and the arms 11 of the plates 1 engage the rods 18 to impart the same rotary motion to the plates 2. The filter plates are thus cleaned as they move past the scrapers 3, 4, respectively. As shown, the spacing of the axes 1ª, 2ª of shaft 7 and hubs 15, 16, respectively, is somewhat less than the width of the filter surfaces of the plates 1, 2. It is possible, of course, to use adjustable hubs 15, 16 that can be moved away from the shaft 7 for a cleaning operation and moved back towards the shaft for normal filter operation.

Various new designs and constructions are made possible by the invention. The scrapers may be made of hard rubber, glass or similar materials since the thickness, and thereby the strength, of the scrapers is not limited by height of a filter slot. Such non-metallic scrapers are of great importance in the case of ceramic filters such as used in the chemical industries as it has not been practical to clean the ceramic filters by the prior mechanical scrapers and cleaning methods.

It is to be understood that the invention is not limited to the construction herein shown and described as various changes may be made in the design and construction of the parts without departing from the spirit of my invention as set forth in the following claims. The sets of filter plates may be mounted for independent rotation or may be connected by gearing, in place of the illustrated radial arms 11 and rods 18, for simultaneous rotation.

I claim:

1. In a slit filter, a plurality of annular filter plates, means mounting alternate filter plates in two sets in overlapping relation and with filter slits between the plates of one set and the plates of the other set, means supporting the respective sets of plates for rotation about axes spaced from each other, and scrapers mounted in two sets at opposite sides of the assembly of filter plates, one set of scrapers extending between adjacent plates of one set to engage the edge of the intermediate plate of the second set, the other set of scrapers extending between adjacent plates of the second set to engage the edge of the intermediate plates of the first set.

2. In a slit filter, the invention as claimed in claim 1, wherein the first set of alternate filter plates is secured to a rotatable shaft, in combination with means actuated by said shaft for rotating the second set of alternate filter plates.

3. In a slit filter, the invention as claimed in claim 1, wherein the plates of the first set have radial arms and a hub for securing the plates to a rotatable shaft, and the second set of plates have openings through which rods extend for engagement by the radial arms of the plates of the first set, whereby rotation of said shaft results in a simultaneous rotation of both sets of plates.

4. In a slit filter, the invention as claimed in claim 1, wherein the spacing of the rotational axes is equal to the radial width of the annular filter surfaces of the filter plates, whereby said scrapers clean the full width of the filter surfaces.

5. In a slit filter, the invention as claimed in claim 1, wherein the spacing of the rotational axes is less than the radial width of the annular filter surfaces of the filter plates, whereby said scrapers clean less than the full width of the filter surfaces.

6. In a slit filter, a plurality of superposed filter members of annular form, means spacing adjacent filter members from each other to provide filter slits, means mounting alternate filter members in two sets for rotation about spaced axes, the axis of each filter member coinciding with its rotational axis, sets of scraper members at opposite sides of the assembly of filter members and having cutting edges located substantially in a plane through said axes of rotation, the scraper members of one set extending between filter members of one set and engaging the edge of the intermediate filter member of the second set, and the scraper members of the second set extending between filter members of the other set to engage the edge of the intermediate filter member of the first set.

7. In a slit filter, the invention as claimed in claim 6, wherein certain of said members are non-metallic.

WILLY HARTMANN.